(12) United States Patent
Willars et al.

(10) Patent No.: US 6,285,667 B1
(45) Date of Patent: Sep. 4, 2001

(54) PAGE RESPONSE ON EXISTING RADIO SIGNALING CHANNEL

(75) Inventors: Per Hans Ake Willars, Stockholm; Johan Lagneborg, Alvsjo, both of (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/203,326

(22) Filed: Dec. 2, 1998

(51) Int. Cl.$^7$ .................................................. H04Q 7/00
(52) U.S. Cl. ...................... 370/329; 370/341; 370/437; 370/465; 455/450
(58) Field of Search ............................ 370/230, 235, 370/236, 313, 314, 328, 329, 341, 345, 437, 465, 534, 535, 537, 538; 455/445, 450, 466

(56) References Cited

U.S. PATENT DOCUMENTS

| | | | |
|---|---|---|---|
| 5,533,029 | * 7/1996 | Gardner | 370/329 |
| 5,535,215 | * 7/1996 | Hieatt, III | 370/329 |
| 5,745,695 | 4/1998 | Gilchrist et al. | |
| 6,144,647 | * 11/2000 | Lopez-Torres | 370/329 |
| 6,163,699 | * 12/2000 | Naor et al. | 455/453 |

FOREIGN PATENT DOCUMENTS 750 439 A1  12/1996  (EP).

OTHER PUBLICATIONS

Sami Tabbane, "Location Management Methods For Third-Generation Mobile Systems," IEEE Communications Magazine, Aug. 1997, pp. 72–78 & 83–84.

\* cited by examiner

Primary Examiner—Ricky Ngo
(74) Attorney, Agent, or Firm—Nixon & Vandehye P.C.

(57) ABSTRACT

When a mobile terminal in a mobile radio network has a user data connection established to a core network node, and receives a page message on a paging channel from a second core network node to which the terminal has no data connection established, the mobile terminal can send a page response message to the second core network node on the existing signaling channel between the mobile terminal and the radio access network associated with the established data connection to that core network node. The page response then triggers a multiplexing between the mobile terminal and radio access network, of the established connection with the first core network node and the desired call connection (precipitated by the page request) from the second core network node. This way, the mobile station can receive simultaneous calls from two different core network nodes over a common traffic and signaling connection.

15 Claims, 3 Drawing Sheets

PAGE RESPONSE ON EXISTING RADIO SIGNALING CHANNEL

FIELD OF THE INVENTION

This invention relates to telecommunications and more particularly to communication protocols in a mobile radio network.

BACKGROUND OF THE INVENTION

Mobile radio networks are wide-spread today and provide a mobile radio user with a large variety of communication options, including voice communications, data communications, short message service communications, voice paging communications, etc. As mobile radios become increasingly prolific in society, the strain on mobile radio communication network to accommodate the volume of mobile radio communications increases. For this reason, efficiencies are always desired in the mobile radio communications environment to simplify and improve call connection procedures and call connection protocols between telephone networks and mobile radios accessing them.

Typically, when a call request is made from a core telephone network to a mobile radio, the core network sends a page request through a radio access network to the mobile station. This page request is sent via a common paging channel monitored by all of the mobile stations assigned to the radio access network. The page request includes a unique identifier associated exclusively with the mobile radio to which the call is destined. The mobile radio (which, as stated previously, is monitoring the page channel) receives the page request and identifies the unique mobile radio identifier associated with the page request as its own. The mobile station then initiates a connection between itself and the caller. The call connection is performed by the radio access network by assigning a channel for use between the mobile station and the core network through which the mobile station and the call originator can communicate.

One of ordinary skill in the art will understand that radio access networks consist of a variety of basic building blocks such as base stations, base station controllers, mobile service switching centers, etc., which permit the mobile stations to communicate with a number of core networks as public telephone switched networks, etc. In this regard, throughout this specification, the phrase "generic radio access network" will refer to the building blocks requested to perform the call connection procedures between a mobile terminal and a core network.

As the volume of traffic in the mobile radio environment increases, it becomes increasingly likely that mobile stations receive simultaneous requests for call connections (or receive a request for a call connection while engaged in an active call). In such situations, the mobile station usually acknowledges to the second requester that it is busy with another call on another channel and therefore cannot accept the second call. It is possible, however, with current technology, for the mobile stations to accept two calls simultaneously, provided the generic radio access network can employ an efficient procedure to connect them. Thus, for example, a mobile station can engage in an active voice telephone call with one core network and still receive on another channel a short message service message from another core network, which can be displayed to the user when the voice telephone call is completed. Unfortunately, however, the present systems usually require the mobile station to employ multiple channels to receive multiple simultaneous messages.

SUMMARY OF THE INVENTION

In the present invention, a mobile station can receive simultaneous messages from two different core networks while employing only a single channel between the generic radio access network and the mobile station. Because the number of channels available to the generic radio access network to be employed simultaneously is limited, the consolidation of multiple simultaneous calls into a single channel reserves capacity in the generic radio access network for other mobile station call connections. In the preferred embodiment of the present invention, the simultaneous call connection is accomplished using a unique page procedure between the core networks, generic radio access network, and mobile station to which the simultaneous calls are destined.

First, a call is established between the mobile station and a first core network through the generic radio access network. Then, another core network pages the mobile station to initiate a second call connection. The page passes from the second core network through the generic radio access network to the mobile station via the dedicated page channel monitored continuously by the mobile station. The mobile station then returns the page response to the second core network using the existing signaling channel between the generic radio access network and the mobile station associated with the established user data channel. This is contrary to traditional thinking which would not provide the page response from the mobile station to the radio access network via the same channel in active use by the mobile station for the previously established call. In the present invention, the mobile station provides the page response to the second core network via the same channel being used for the established call (up to the generic radio access network) and via a newly established multiplexed channel (from the radio access network to the second core network). Thus, the page response triggers a multiplexing in the radio access network of two user connections: one from the radio access network to the first core network and a second from the radio access network to the second core network. The multiplexed connections are then fed from the mobile station to the radio access network via a single channel, preferably the previously established channel used by the first core network to communicate from the radio access network to the mobile station.

In alternative embodiments, the same procedure is used when a call is established with a first core network and a second call comes through the same core network. In such a case, the core network can multiplex the calls without coordinating with existing connections.

In some embodiments, the existing channel is reused. However, in other embodiments, the page message is kept uncoordinated (sent in parallel on the page channel). Thus, avoiding the need to coordinate the page message with a possibly existing radio channel significantly reduces the complexity of the generic radio access network, e.g. in the case where a page request from the core network is sent to another node within the generic radio access network other than the one currently handling the connection to the mobile terminal. In this case, the added complexity in the mobile terminal to monitor a page channel in parallel to communication on a dedicated radio channel is minor compared to requiring the mobile terminal to receive and especially transmit two radio channels independently.

BRIEF DESCRIPTION OF THE DRAWINGS

Other advantages and objects of the present invention will be described in detail with reference to the accompanying drawings, in which.

DETAILED DESCRIPTION OF THE
PRESENTLY PREFERRED EMBODIMENTS

Figure 1:
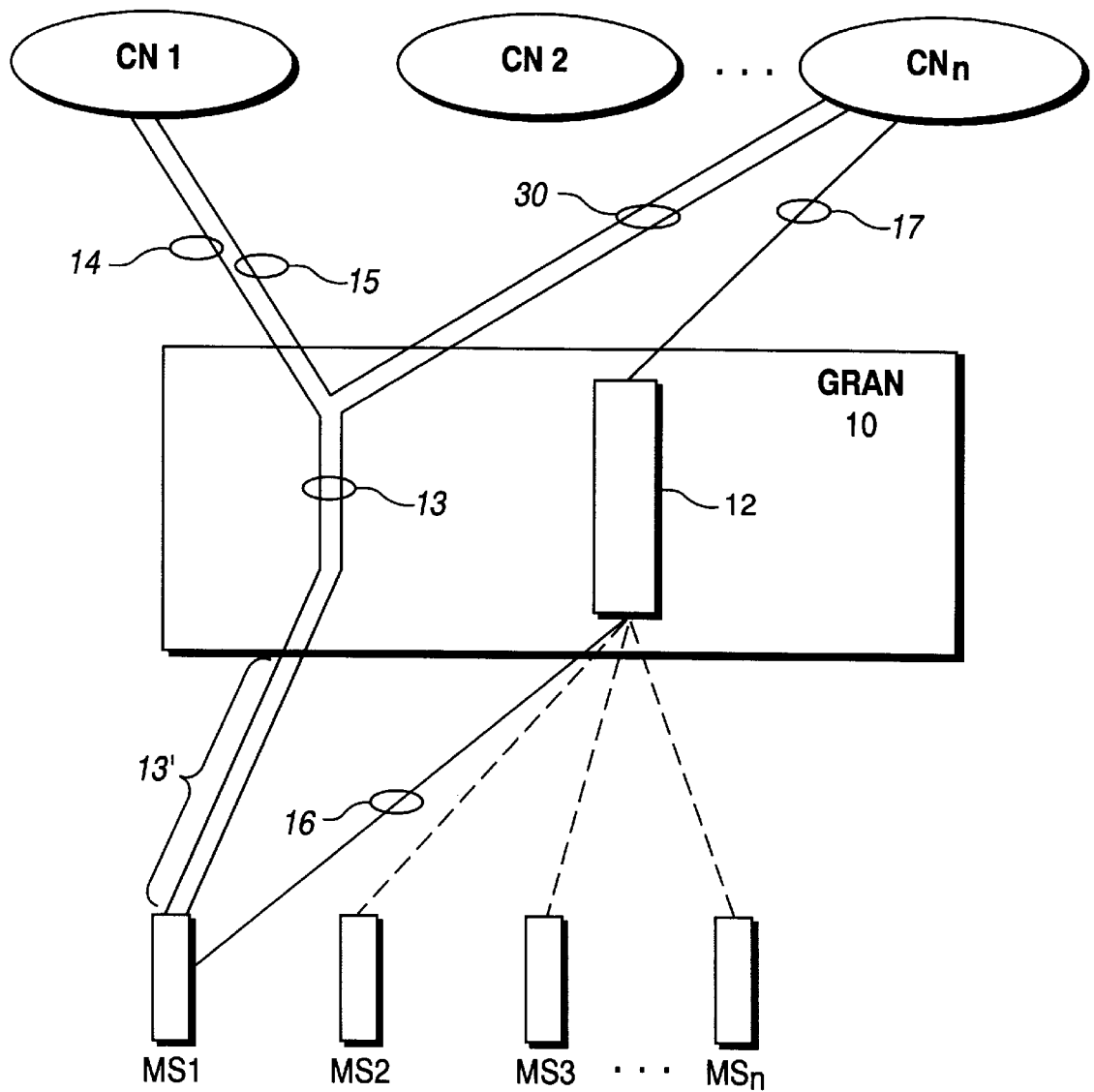
FIG. 1 is a schematic diagram of a simplified mobile radio network.
Figure 2:
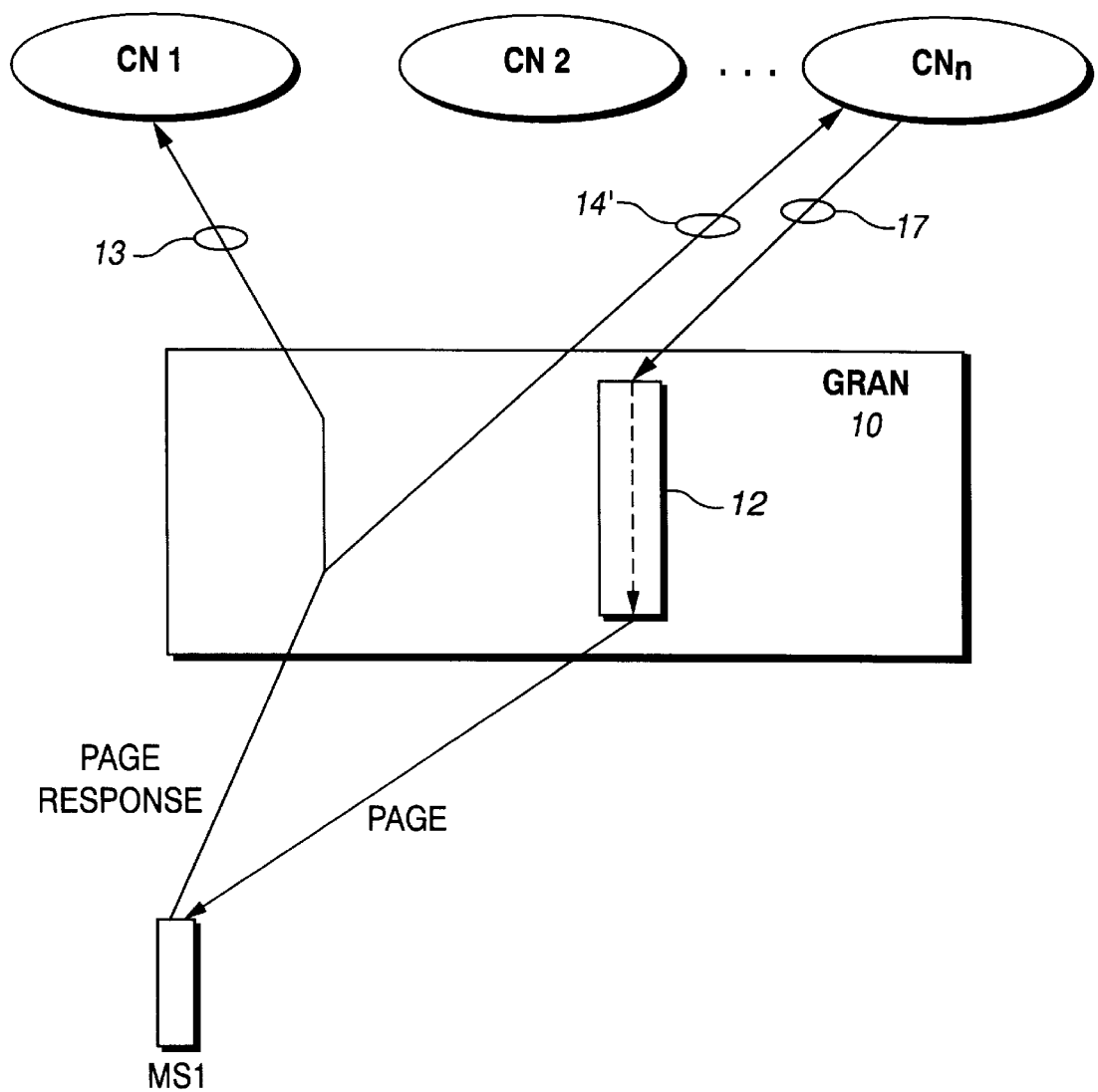
FIG. 2 is a schematic diagram of a page and page response in accordance with an example embodiment of the present invention.

FIG. 1 illustrates a schematic diagram of a simplified mobile radio services network in accordance with an example embodiment of the present invention. In FIG. 1, core networks $CN_1$, $CN_2$, ... $CN_n$ communicate with a generic radio access network 10. The principle function of the generic radio access network 10 is to establish channels for calls to connect between the various core networks $CN_1$, $CN_2$, ... $CN_n$ and the various mobile stations MS1, MS2, MS3 ... $MS_n$ to which the generic radio access network 10 communicates. One of ordinary skill in the art will understand that the generic radio access network 10 comprises a number of basic building blocks including base stations, base station controllers, etc. The various functionalities of these building blocks are well-known in the art for establishing call connections between the core networks $CN_1$, $CN_2$, ... $CN_n$ and the various mobile stations.

In FIG. 1, a user data channel (UDC) 13 is established between core network 1 and mobile station 1 through the generic radio access network 10. The UDC 13 consists of a signaling channel 14 and a traffic channel 15. The UDC 13 is the channel assigned by the generic radio access network 10 for an active call between the core network 1 and the mobile station 1. That is, in the instant in time reflected in FIG. 1, mobile station 1 is engaged in active communication between itself and the core network 1 via the UDC 13.

At the same time, the mobile station 1 is continually monitoring the common page channel 12 of the generic radio access network 10. Equally so, all of the mobile stations MS2, MS3, MSn are also monitoring the page channel 12 for page requests. The pages received via the page channel contain information identifying the mobile station to which the page is intended to be delivered. The mobile stations monitor the page channel 12 for pages, as shown in FIG. 1 (via the dotted lines).

In the moment in time shown in FIG. 1, although mobile station MS1 is engaged in the active call between itself and $CN_1$ via UDC 13, a page request comes from $CN_n$ at channel 17 to the generic radio access network 10, which passes the page request onto the common page channel 12 where it is received by the mobile station MS1 via page request channel 16. The mobile station MS1 is thus in a conflict since it is engaged in an active call from $CN_1$ while receiving a page request on channel 16. Traditionally, the mobile station MS1 would have to respond to the page request (to $CN_n$) by indicating its busy status or (if very sophisticated) by requesting a second UDC to be established between the $CN_1$ and the mobile station MS1 via the generic radio access network 10.

In accordance with the present invention, however, the situation shown in FIG. 1 is handled by multiplexing call connections from the core networks $CN_1$ and $CN_n$ at the generic radio access network 10 such that the mobile station 1 receives both calls (from $CN_1$ and $CN_n$) simultaneously over a single UDC access channel portion 13'. In order to accomplish this, the page request sent from $CN_n$ to generic radio access network 10 (item 17) is received by the mobile station MS1 via channel 16. Then, MS1 responds to the page request via UDC access channel portion 13' (to the radio access network 10). That is, the mobile station receives the page request from core network $CN_n$ and then responds to the page request on the same channel being actively used for a communication session with a different core network $CN_1$. In particular, the page response from the mobile station MS1 is sent to radio access network 10 via the same channel portion 13' used by the core network $CN_1$ to engage in the active call with the mobile station MS1.

Figure 3:
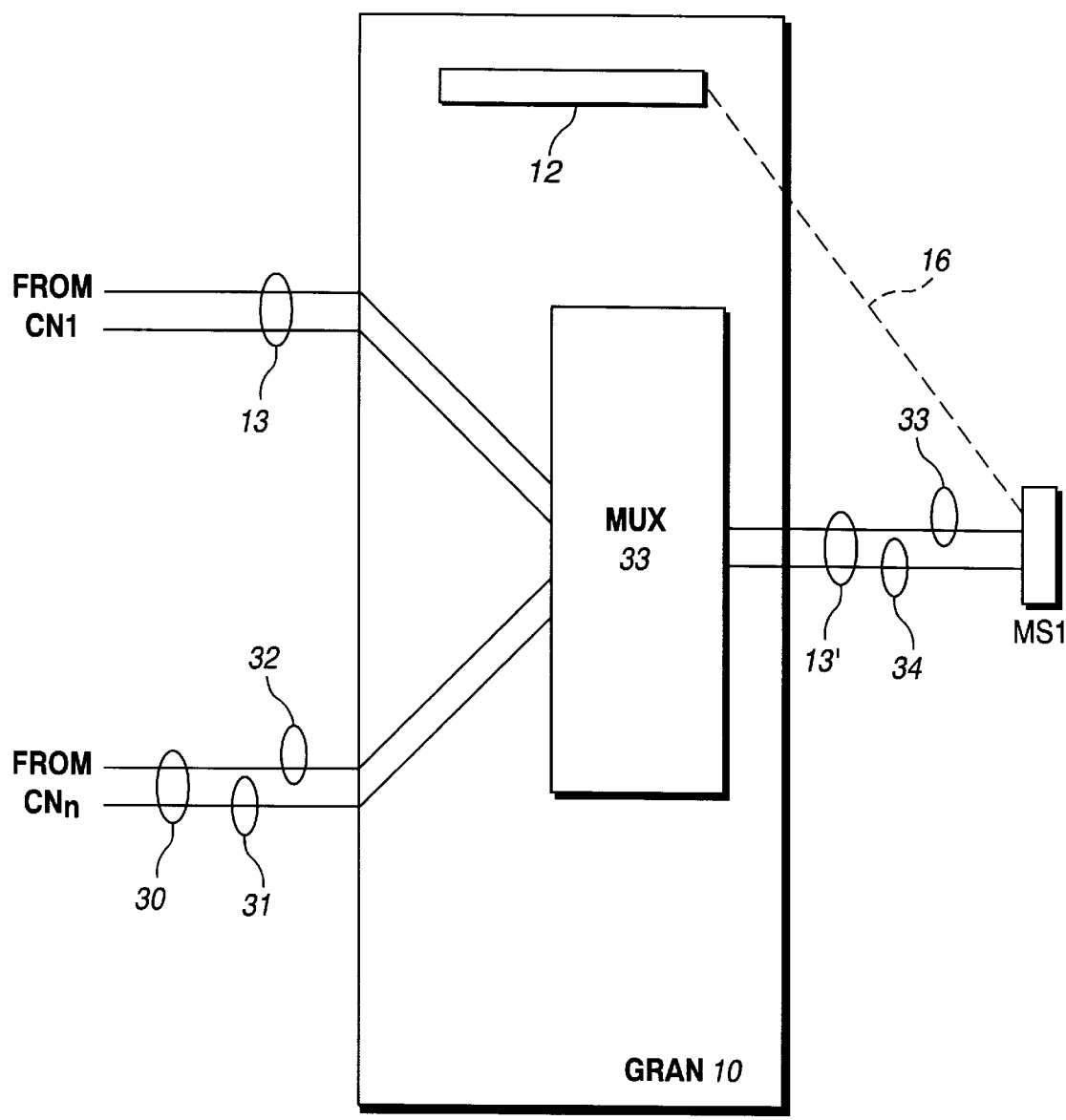
FIG. 3 is an example embodiment of a generic radio access network 10 in simplified form in accordance with an example embodiment of the present invention.

The receipt of the page response in the radio access network 10 triggers the situation illustrated in FIG. 3. In particular, the UDC 13 from core network $CN_1$ is shown entering the generic radio access network 10 and continuing through a multiplexer 33 to access channel portion 13' to the mobile station MS1. Also, UDC 30 is established from core network $CN_n$ to multiplexer 33 in the generic radio access network 10. Like UDC 13 from $CN_1$, the UDC 30 from $CN_n$ includes a traffic channel 32 and a signaling channel 31. The traffic channel 32 and signaling channel 31 connect communications between the core network $CN_n$ and the multiplexer 33. Then, when the MS1 responds to a page request, it does so via channel 13' to radio access network 10 (that is, the same channel being used previously to communicate from $CN_1$ to MS1). MUX 33 then splits the signal such that data and signaling relevant to the previously established call are routed to $CN_1$, while data and signaling relevant to the page response are routed to $CN_1$. From radio access network 10, the established call data and signaling travels via UDC 13 (as before) and the page data/signaling travels via channel 30 (established between radio access network 10 and $CN_n$).

Methods for routing traffic information in a multiplexer 33 are well-known and vary widely depending on the kinds of efficiencies desired and the practical constraints of core networks. One example method is to assign headers associated with the respective core networks (or, alternatively associated with the respective data types) to identify to the radio access network 10 (and specifically MUX 33) to which core network (and hence which caller) the data packets should be routed. One of ordinary skill in the art will well understand other ways to generically combine traffic information (such as packet data) in multiplexer 33, as depicted in FIG. 3. The effect of multiplexing the traffic at MUX 33 is a single channel between the generic radio access network 10 and the mobile station MS1 containing the traffic and signal information to/from both the core network $CN_1$ and the core network $CN_n$. As depicted in FIG. 3, the same UDC 13' is employed from the generic radio access network 10 to the mobile station MS1 to provide the multiplexed traffic information 33 and the multiplexed signaling information 34 to the mobile station MS1, thus requiring the radio access network to assign and tie up only one channel (13') for the one mobile station MS1.

As also depicted in FIG. 3, the mobile station MS1 will continue to monitor the page channel 12 from the generic radio access network 10.

As one of ordinary skill in the art will readily understand, the present invention allows a mobile station to receive simultaneous calls from two different core networks, without further burdening mobile station channel availability at the radio access network. This can be particularly advantageous when the mobile station is engaged in an active voice telephone call and receives a page request for, for example, a short message service message. While the user is engaged in the voice telephone call, the mobile station can receive the short message service message from another core network and then display the short message service message to the user when the user has completed the voice telephone call, all over the same channel 13'. Other types of simultaneous call embodiments can also be envisioned in which the present invention allows multiplexed simultaneous calls to be received by a mobile station on a single channel.

By assigning two simultaneous calls to the same channel between a generic radio access network and a mobile station, channel capacity in the generic radio access network is reserved for other calls between the generic radio access network and other mobile stations. This thus preserves channel availability and reduces consumed radio resources. In addition, the generic radio access network in accordance with the present invention needs only to coordinate the connections when the paging is successful, which reduces the load on the generic radio access network 10.

The present invention also provides the advantage of eliminating any requirement of the generic radio access network to maintain a table of identities of mobile stations for paging coordination purposes.

In an alternative embodiment, the core network $CN_1$ is engaged in an active call via UDC 13 and then receives a second call request through the same core network ($CN_n$) to the same mobile station MS1. In this embodiment, the same procedure can be employed in that the core network $CN_1$ pages the mobile station MS1 with the second call request and the mobile station MS1 responds to the page indicating its ability to receive the calls simultaneously. In this embodiment, there is the added advantage of the core network node $CN_1$ not needing to coordinate with existing connections to place the second call since the connection already exists between the core network $CN_1$ and the mobile station MS1.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of connecting calls through a radio access network to a mobile radio in active communication with a first core network on a first call, comprising the steps of:

receiving the first call on a first core network channel;

delivering the first call to the mobile radio on a call channel;

receiving a page request from a second core network;

delivering the page request to the mobile radio on a page channel while continuing to maintain the first call on the call channel;

receiving a page response from the mobile radio on the call channel;

establishing a second core network channel to the second core network; and delivering the page response to the second core network on the second core network channel.

2. A method according to claim 1, further including the steps of:

receiving a second call from the second core network, multiplexing the first call from the first core network with the second call from the second core network, delivering the multiplexed first and second calls to the mobile radio on the call channel.

3. A method according to claim 1, wherein the first and second core networks are the same core network.

4. A method according to claim 1, wherein the step of receiving the page request occurs over a page channel monitored by the mobile radio while in said active communication on the first call.

5. A method according to claim 1, wherein the page response is delivered on a signaling line of the call channel.

6. A method according to claim 2, further including the step, after the step of delivering the multiplexed first and second calls, of simultaneously processing the first and second calls at the mobile radio.

7. A radio access network, comprising:

a plurality of network links to establish call traffic communications with a plurality of core networks, a plurality of mobile station links to establish call traffic communications with a plurality of mobile stations, a page channel monitored by the plurality of mobile stations and in communication with the core networks to receive page requests for the establishment of call connections to the mobile stations, a multiplexer for combining call traffic communications from first and second core networks onto a single channel for communication of a plurality of calls to a single mobile station, said multiplexer being initiated by a page request on said page channel from said first core network and a page response on said single channel from said single mobile station.

8. A radio access network according to claim 7, wherein:

said page channel is in substantially continuous communication with said plurality of mobile stations.

9. A radio access network according to claim 7, wherein:

said plurality of network links establish a first call on a first core network channel from said first core network and a second call on a second core network channel from said second core network.

10. A radio access network according to claim 9, wherein:

said multiplexer combines said second call with said first call and delivers the combined signals onto said single channel.

11. A radio access network according to claim 7, wherein:

said plurality of network links and said plurality of mobile station links comprise traffic channels and signal channels, and said multiplexer combines traffic channels from said first and second core networks and combines signal channels from said first and second core networks.

12. A radio access network according to claim 7, wherein:

said plurality of network links and said plurality of mobile station links comprise traffic channels and signal channels, and said multiplexer routes traffic channels to corresponding first and second core networks and routes signal channels to corresponding first and second core networks.

13. A system for connecting a second call to a mobile radio engaged in an active first call, comprising:

a first core network, a second core network, a generic radio access network in communication with said first core network via a first core network channel and with a second core network via a second core network channel and containing a page channel in communication with said first and second core networks, a plurality of mobile terminals in communication with said generic radio access network and monitoring said page channel, a first of said mobile terminals engaged in said active first call with said first core network via a mobile terminal call channel and the first core network channel, wherein said generic radio access network includes a multiplexer to receive via the mobile terminal call channel a page response signal from said first mobile terminal and to route the page response signal to the second core network via the second core network channel while continuing to route said active first call from said mobile terminal call channel to said first core network via the first core network channel.

14. A system according to claim 13, wherein:

the first call is communicated between said generic radio access network and said first mobile terminal via first traffic and control channels of said mobile terminal call channel, and after said page response, said multiplexer consolidates said first and second calls to first one mobile terminal via said first traffic and control channels.

15. A system according to claim 13, wherein:

the first call is communicated from said first core network to said generic radio access network via first traffic and control channels of said first core network channel, the second call is communicated from said second core network to said generic radio access network via second traffic and control channels of said second core network channel, the first and second calls are communicated from said generic radio access network to said first mobile terminal via third traffic and control channels of said mobile terminal call channel; and the page request is received by said first mobile terminal via said page channel, the page response is sent by said first mobile radio to the generic radio access network via said third traffic and control channels, and the page response is sent by said generic radio access network to said second core network via said second traffic and control channels.

* * * * *